United States Patent Office 3,430,891
Patented Mar. 4, 1969

3,430,891
AUTOMATIC LOCKING MECHANISM FOR A SAFETY BELT OR HARNESS
David William Burleigh, Yateley, England, assignor to Britax (London) Limited, Byfleet, Surrey, England, a corporation of the United Kingdom
Filed May 4, 1967, Ser. No. 636,217
Claims priority, application Great Britain, May 4, 1966, 19,648/66
U.S. Cl. 242—107.4    13 Claims
Int. Cl. B65h 75/48; B60r 21/10

ABSTRACT OF THE DISCLOSURE

An automatic locking mechanism for a safety belt including a rotatable storage reel for the belt, biased for rotation in a direction to wind-up or retract the belt, a first inertia mass displaceable from a position of rest upon sudden change of movement or direction of movement of the vehicle in which the mechanism is mounted and a second inertia mass displaceable from a normal position of rest upon acceleration, in the rate of withdrawal of the belt from the storage reel, beyond a predetermined maximum, each inertia mass independently of the other being adapted upon displacement to lock or cause locking of the storage reel against rotation in a direction of belt withdrawal.

---

This invention relates to an automatic locking mechanism for a safety belt or harness (hereinafter generically referred to as a "safety belt") which is used to hold an occupant in his seat when the vehicle or craft (hereinafter referred to generically as "vehicle"), in which he is travelling, undergoes a sudden change in movement or direction of movement. There are two basic mechanisms known for automatic locking devices for safety belts and several different constructions are known. These two mechanisms hereinafter are referred to as the "inertia lock" and the "inertia reel."

Both mechanisms each include a rotatable storage reel about which the belt is wound, the reel being biased for rotation in a direction to wind up the belt. Thus when the belt is in use under normal conditions and not an emergency, it is possible for the wearer and seat occupant to move in his seat, for example to lean forward. As the wearer moves the belt is drawn from or retracted on to the storage reel. In an emergency, for example, when the vehicle is involved in a collision the reel is locked against rotation in the direction of belt withdrawal.

The inertia lock includes an inertia member which is displaceable from a position of rest when the vehicle, in which the lock is mounted, makes a sudden change in movement for example sudden deceleration or sudden divergence from its direction of travel. The inertia member may be in the form of a ball in a dished support or a pendulum, arranged to lock or cause locking of the reel against rotation in the belt withdrawal direction, when displaced from its position of rest. Thus under normal conditions the occupant, with the safety belt around him, is free to move in his seat. In the event of the vehicle braking suddenly or being in a collision, the inertia member is instantaneously displaced so that the reel is locked and the occupant is not thrown forward out of his seat.

The inertia reel is a mechanism which is sensitive to sudden acceleration in the rate of withdrawal of a safety belt from its storage reel. Thus an inertia member is provided which rotates or orbits with the storage reel and is relatively displaceable to lock or cause locking of the reel when its rotation in the belt withdrawal direction is suddenly accelerated. The occupant acts as a "primary inertia mass" because it is the sudden movement of the occupant out of his seat which causes sudden acceleration in the rate of belt withdrawal and hence in the rate of reel rotation. It will be appreciated that only a very small amount of movement of the occupant out of his seat, is required to cause the reel to lock.

According to the present invention an automatic locking mechanism for a safety belt includes a rotatable storage reel for the belt, biased for rotation in a direction to wind-up or retract the belt, a first inertia mass displaceable from a position of rest upon sudden change of movement or direction of movement of the vehicle in which the mechanism is mounted and a second inertia mass displaceable from a normal position of rest upon acceleration, in the rate of withdrawal of the belt from the storage reel, beyond a predetermined maximum, each inertia mass independently of the other being adapted upon displacement to lock or cause locking of the storage reel against rotation in a direction of belt withdrawal.

The first inertia mass may comprise a ball resting in a dished support, an actuating member resting on the ball or co-operating with the ball and associated with a locking latch. With this arrangement when the ball is displaced from its position of rest at the bottom of the dished support the actuating member is lifted and moves the latch into engagement with a tooth of a toothed ring fast with the rotatable storage reel.

The second inertia mass may comprise one or more bob weights pivotally mounted on the storage reel or a member associated therewith, for example the aforementioned toothed ring. Thus the bob weights move in an orbital path upon rotation of the reel. Biasing means are provided to constrain each bob weight radially inwardly, with respect to the axis of rotation of the reel, into a position of rest. Thus upon rotation of the reel above a predetermined maximum each bob weight moves radially outwardly against its biasing means. Preferably each bob weight is provided with a latching nose to engage with the aforementioned locking latch to draw it into engagement with a tooth of the toothed ring.

With a mechanism constructed in the foregoing manner there is only one locking device per se but this is independently actuated to lock the reel against rotation by the first and the second inertia masses.

An embodiment of the present invention is now described with reference to the accompanying drawing in which.

Figure 1:
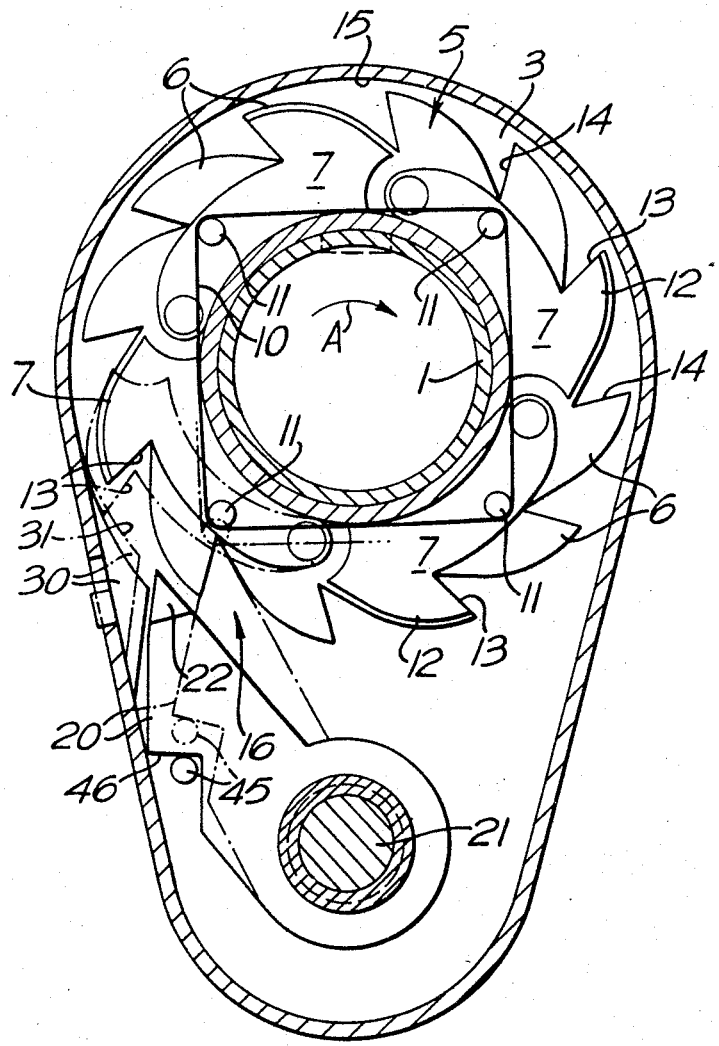
FIGURE 1 is a section on the line I—I of FIGURE 2.
Figure 2:
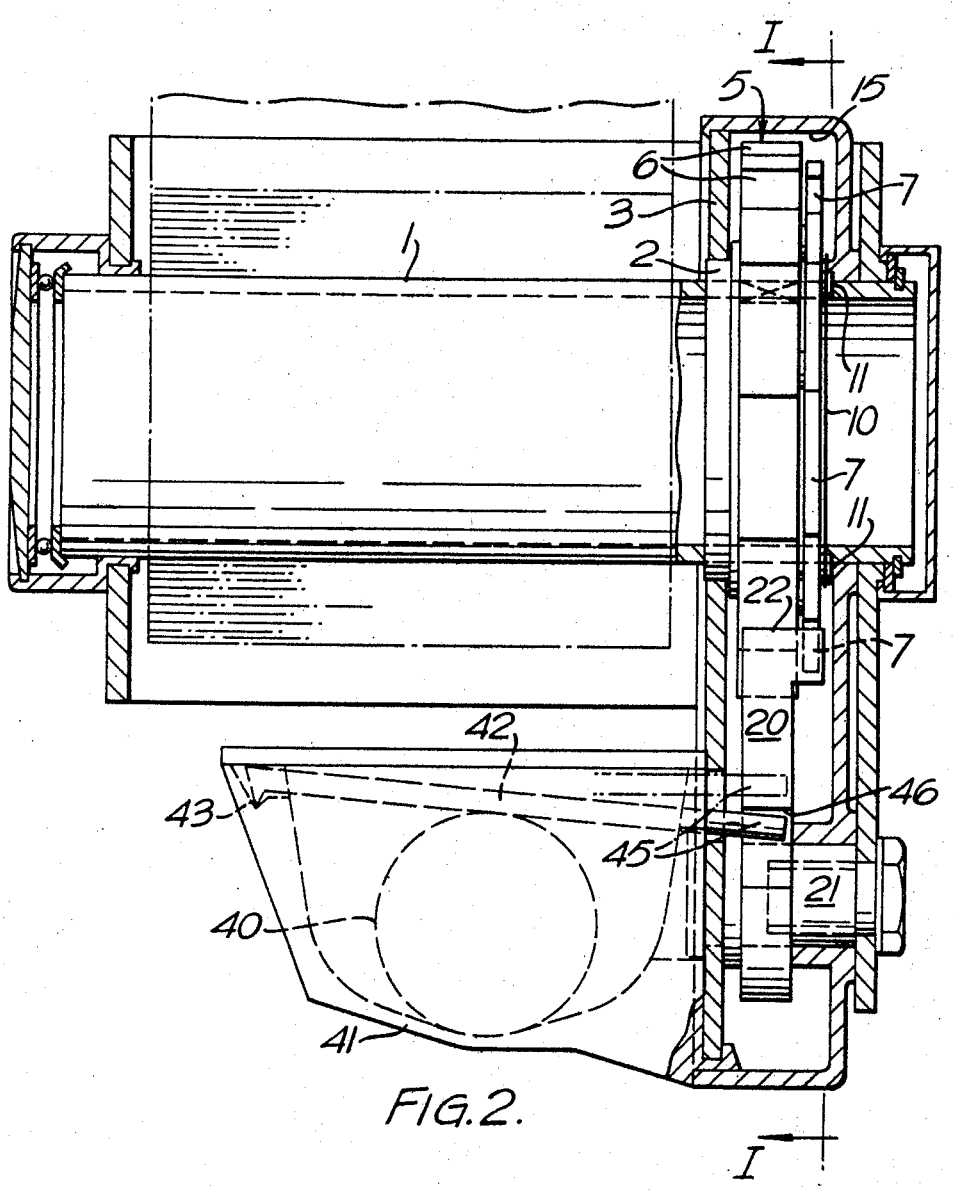
FIGURE 2 is a sectional elevation.

Referring to the drawing a rotatable storage reel 1 is mounted by a bearing 2 in a main frame support member 3. This frame member 3 is a load bearing member and is suitably arranged, in a manner not shown, to be bolted or otherwise secured to an anchorage point on the vehicle body or chassis.

The reel 1 is provided with biasing means not shown to rotate it in the direction of belt wind-up or retraction indicated by the arrow A in FIGURE 1.

Keyed to the wheel 1 so that it is fast therewith is a ring 5 having a plurality of circumferentially spaced locking teeth 6. Four bob weights 7 are pivotally mounted to a side face of the ring 5. The point of pivotal mounting of each bob weight is at its forward end with respect to the direction of movement of the weight when it is moved in its orbital path upon rotation of the reel 1 in a belt withdrawal direction.

A rubber spring 10 is entrained around pins 11 carried by the bob weights 7 and serves as a biasing means to constrain the bob weights radially inwardly into their position of rest. Towards its rearward end, remote from the point of pivotal attachment to the ring 5, each bob weight 7 is provided with a latching nose 12 providing a latch engagement face 13. As can be seen in FIGURE 1 the latching nose 12 of each bob weight 7 coincides or registers with a tooth 6 of the ring 5, the latching faces 13 being respectively co-planar with latching faces 14 of the tooth 6.

When the reel 1 rotates at a rate above a predetermined maximum the bias of the rubber spring 10 is insufficiently strong to constrain the bob weights 7 in their radially inwardly disposed positions. Thus the bob weights 7 pivot radially outwardly. This outward movement of the bob weights may be primarily due to centrifugal force or inertia of the bob weights which tends to cause them to lag behind upon acceleration in the rate of rotation of the reel 1. Whether inertia or centrifugal force is the prime factor in causing the bob weights to move outwardly is not essential to the present invention provided that the bob weights do move radially outwardly. The question of whether centrifugal force or inertia causes outward movement of the bob weights depends upon the relative disposition of the centre of gravity of each bob weight and its fulcrum for pivotal movement.

Encircling the bob weights over a major part of the circumference surrounding the orbital path of the bob weights 7 is a guide 15. Thus the bob weights are limited to the extent which they can move radially outwardly except in the gap 16.

At this gap there is provided a locking pawl 20 mounted for free pivotal movement on a shaft 21. The pawl 20 is provided with a nose 22 appropriately shaped to engage and lock with the teeth 6 of the ring 5. It will be appreciated from what has been said hereinbefore that when the reel is rotated in excess of the predetermined maximum rate so that the bob weights 7 are moved radially outwardly, one of the bob weights as it passes across the gap 16 will move radially outwardly to a sufficient extent for its latching face 13 to engage with the nose 22 of the locking pawl 20 and draw the pawl in to engage with a tooth 6 of the ring 5, with which tooth the bob weight is in register. Thus the reel is locked against rotation in a direction of belt withdrawal, the load of locking being carried by the pawl 20 and the ring 5.

When loading on the safety belt, which causes locking to occur, is taken off, the biasing means of the reel 1 will tend to rotate it in a belt retraction direction and the locking pawl 20 is thus released from engagement with a tooth 6 of the ring 5 and pushed into its normal position of disengagement by the next tooth in the series. The pawl 20 is balanced to stay in any position in which it is placed and it does not tend of its own accord to swing back into its normal position of rest.

Under some circumstances it may be desirable to provide a mechanism which renders the bob weights inoperative so that irrespective of the rate of rotation of the reel in a belt withdrawal direction the bob weights 7 cannot swing radially outwardly to engage with the pawl 20. Such a mechanism is illustrated in the accompanying drainigs, in FIGURE 1, and comprises a slidable cam piece 30 which may be moved from the position shown in full lines to the position shown in dotted lines. When in the full line position the cam piece 30 is inoperative and the bob weghts 7 can move radially outwardly to engage with the pawl 20. However, if the cam piece 30 is moved into the position shown by the dotted lines its end faces 31 form an extension of the guide 15 so that the bob weights 7 cannot move radially outwardly to engage with the nose 22 of the locking pawl 20.

The cam piece 30 can also be used to vary the sensitivity of functioning of the bob weights 7. It will be appreciated that the rate of movement outwardly of the bob weights is dependent on and related to the bias of the rubber spring 10 and the rate of rotation of the reel. The bias of the spring is fixed and therefore any variation in the rate of rotation of the reel will cause a variation in the rate of outward movement of the bob weights.

The bob weights move in an orbital path upon rotation of the reel and the length of the arc, in that path, through which each bob weight travels whilst it is simultaneously moving outwardly into a position whereby it may engage the locking pawl 20 will vary according to the rate of outward movement of the bob weight. Thus the faster the rate of outward movement, the shorter the arc of travel. The cam piece 30 can be located to set a limit to the length of the arc through which a bob weight can travel and simultaneously move outwardly a sufficient extent to engage the locking pawl. It will therefore be appreciated that according to the setting of the cam piece the reel has to be rotated at a certain rate to cause movement of the bob weight outwardly sufficiently rapidly so that upon disengaging from the cam piece it moves out far enough to engage the nose of the locking pawl, before it has travelled in its orbital path beyond the nose.

An inertia ball 40 is provided resting in the bottom of a dished support 41 attached to the main frame member 3. Resting on top of the ball 40 is an actuating plate 42 pivoted on one side by knife edge bearings 43. An arm 45 extends from the plate 42 through a slot (not shown) in the main frame 3 and engages under a step 46 formed on the locking pawl 20. Thus when the plate is lifted, pivoting about the knife edge bearings 43, the arm 45 rocks the locking pawl 20 to bring its nose 22 into engagement with one of the teeth 6 of the ring 5. The inertia ball 40 is freely movable in the dished support 41 so that if the locking mechanism, as a whole, is moved suddenly or there is a sudden change in the movement to which it is already being subjected, as would occur when the vehicle in which the locking mechanism is mounted is involved in a collision, the ball 40 is displaced from its position of rest at the bottom of the dished support thereby lifting the actuating plate 42.

As hereinbefore mentioned the locking pawl 20 and the toothed ring 5 constitute the locking device per se and the pawl 20 is moved into its locking position by either the bob weights 7 or the inertia ball 40, each independently of the other.

What is claimed is:
1. A dual sensitive automatic locking mechanism for a safety belt comprising a support member adapted to be secured to a vehicle in which the mechanism is to be mounted, a rotatable storage reel for the belt, means mounting said reel for rotation within said support member, means biasing said reel in the retracting direction of rotation of said reel, a plurality of teeth carried by said reel, first inertia mass means displaceable from a position of rest upon sudden change of movement of the vehicle, locking means movable in response to the displacement of said first inertia mass means for engaging one of said teeth to thereby prevent rotation of said reel, second inertia mass means having a latching nose disposed in alignment for engaging said locking means, and said second inertia mass means being pivotally carried by said reel whereby upon rotation of said reel in the direction of withdrawal beyond a predetermined maximum acceleration said latching nose moves radially outwardly and engages said locking means.

2. The dual sensitive automatic locking mechanism as defined in claim 1 wherein said latching nose is normally positioned adjacent one of said teeth and includes a surface for directing said locking means into abutting engagement with said last-mentioned tooth.

3. The dual sensitive automatic locking mechanism as defined in claim 1 including means for varying the rate of radial outward movement of the latching nose upon the rotation of the reel in its direction of withdrawal to thereby provide a range of predetermined maximum accelerations between which said latching nose will engage said locking means.

4. The dual sensitive automatic locking mechanism as defined in claim 1 wherein said locking means is a locking pawl, and means are provided for pivotally mounting said locking pawl about an axis parallel to the axis of said reel.

5. The dual sensitive automatic locking mechanism as defined in claim 1 wherein said locking means is a locking pawl, means for pivotally mounting said locking pawl about an axis parallel to the axis of said reel, and actuating means between said first inertia mass means and said locking pawl for moving said locking pawl into engagement with one of said teeth in response to displacement of said first inertia mass means.

6. The dual sensitive automatic locking mechanism as defined in claim 1 including means normally biasing said second inertia mass means to a radially innermost position thereof.

7. The dual sensitive automatic locking mechanism as defined in claim 2 including means for varying the rate of radial outward movement of the latching nose upon the rotation of the reel in its direction of withdrawal to thereby provide a range of predetermined maximum accelerations between which said latching nose will engage said locking means.

8. The dual sensitive automatic locking mechanism as defined in claim 2 including means normally biasing said second inertia mass means to a radially innermost position thereof.

9. The dual sensitive automatic locking mechanism as defined in claim 3 including means normally biasing said second inertia mass means to a radially innermost position thereof.

10. A dual sensitive automatic locking mechanism for a safety belt comprising a support member adapted to be secured to a vehicle in which the mechanism is to be mounted, a rotatable storage reel for the belt mounted for rotation within said support member, means biasing the reel in a direction to retract the belt, a plurality of teeth carried by said reel, a first inertia mass means displaceable in any horizontal direction from a position of rest upon sudden change of movement of the vehicle, actuating means in contact with said first inertia mass means, a pivotally mounted locking catch, said actuating means being additionally in contact with said locking catch whereby upon displacement of said first inertia mass means from its position of rest said actuating means moves said locking catch into engagement with one of said plurality of teeth, at least one additional inertia mass means pivotally carried by said reel, said additional inertia mass means including a latching nose in alignment for engaging said locking catch upon rotation of said reel in the direction of withdrawal beyond a predetermined maximum acceleration which causes radial outward movement of said latching nose, and abutment means against which the locking catch is drawn by the latching nose.

11. The dual sensitive automatic locking mechanism as defined in claim 10 including means for varying the rate of radial outward movement of the latching nose upon the rotation of the reel in its direction of withdrawal to thereby provide a range of predetermined maximum accelerations between which said latching nose will engage said locking means.

12. The dual sensitive automatic locking mechanism as defined in claim 10 including means normally biasing said second inertia mass means to a radially innermost position thereof.

13. The dual sensitive automatic locking mechanism as defined in claim 11 including means normally biasing said second inertia mass means to a radially innermost position thereof.

References Cited
UNITED STATES PATENTS

| | | | |
|---|---|---|---|
| 3,226,053 | 12/1965 | Petty | 242—107.4 |
| 3,237,729 | 3/1966 | Proctor. | |
| 3,323,749 | 6/1967 | Karlsson | 242—107.4 |
| 3,343,763 | 9/1967 | Spouge | 242—107.4 |
| 3,343,765 | 9/1967 | Baker | 242—107.4 |

WILLIAM S. BURDEN, *Primary Examiner.*